US009001025B2

(12) United States Patent  
Nam

(10) Patent No.: US 9,001,025 B2  
(45) Date of Patent: *Apr. 7, 2015

(54) REFLECTIVE TYPE DISPLAY APPARATUS USING DIELECTROPHORESIS AND METHOD OF MANUFACTURING THE REFLECTIVE TYPE DISPLAY APPARATUS

(75) Inventor: Yun-woo Nam, Yongin-si (KR)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 1152 days.

This patent is subject to a terminal disclaimer.

(21) Appl. No.: 12/654,096

(22) Filed: Dec. 10, 2009

(65) Prior Publication Data

US 2010/0188317 A1    Jul. 29, 2010

(30) Foreign Application Priority Data

Jan. 29, 2009    (KR) .................. 10-2009-0006988

(51) Int. Cl.
  *G09G 3/34* (2006.01)
  *G02F 1/167* (2006.01)
(52) U.S. Cl.
  CPC ............ *G09G 3/344* (2013.01); *G02F 1/167* (2013.01); *G09G 3/3446* (2013.01); *G02F 2001/1676* (2013.01); *G02F 2203/30* (2013.01); *G09G 2300/0426* (2013.01); *G09G 2300/0439* (2013.01); *G09G 2300/0443* (2013.01); *G09G 2300/0452* (2013.01)
(58) Field of Classification Search
  CPC ................................. G09G 3/00; G02B 26/00
  USPC .......................................................... 345/76
  See application file for complete search history.

(56) References Cited

U.S. PATENT DOCUMENTS 5,961,804 A * 10/1999 Jacobson et al. .............. 204/606  
6,177,921 B1 * 1/2001 Comiskey et al. ............ 345/107  
6,741,386 B2 * 5/2004 Minami ........................ 359/296

(Continued)

FOREIGN PATENT DOCUMENTS

JP    2005-505021 A    2/2005  
JP    2006-017751 A    1/2006

(Continued)

OTHER PUBLICATIONS

Korean Office Action issued in Korean Patent Application No. 10-2009-0006988, dated Dec. 31, 2014.

*Primary Examiner* — Quan-Zhen Wang  
*Assistant Examiner* — David Lee  
(74) *Attorney, Agent, or Firm* — Harness, Dickey & Pierce, P.L.C.

(57) ABSTRACT

Example embodiments relate to a reflective type display apparatus using dielectrophoresis and a method of manufacturing the reflective type display apparatus. The display apparatus may include a first substrate and a second substrate arranged so as to face each other; a hydrophobic insulating layer formed on the first substrate; a hydrophobic pattern electrode unit arranged to form a non-uniform electric field; a hydrophilic dielectric medium with hydrophobic uncharged particles therein in a space between the first substrate and the second substrate; and a reflective plate arranged under the first substrate. The display apparatus may form an image by using dielectrophoresis of the hydrophobic uncharged particles according to an electric field gradient formed by the hydrophobic pattern electrode unit.

22 Claims, 14 Drawing Sheets

(56) References Cited

U.S. PATENT DOCUMENTS

| | | |
|---|---|---|
| 7,259,744 B2* | 8/2007 | Arango et al. ............... 345/107 |
| 2003/0070929 A1* | 4/2003 | Shannon et al. ............. 204/606 |
| 2007/0121194 A1* | 5/2007 | Kanbe .......................... 359/296 |
| 2008/0024432 A1* | 1/2008 | Lee et al. ..................... 345/107 |
| 2008/0204370 A1* | 8/2008 | Feenstra et al. ............... 345/60 |
| 2008/0204399 A1* | 8/2008 | Choi et al. ................... 345/107 |
| 2008/0261159 A1* | 10/2008 | Chopra et al. ............... 430/319 |

FOREIGN PATENT DOCUMENTS

| | | |
|---|---|---|
| JP | 2007-057722 A | 3/2007 |
| JP | 2007-187696 A | 7/2007 |
| KR | 10-2007-0112073 | 11/2007 |
| WO | WO-03/032070 A1 | 4/2003 |

* cited by examiner

REFLECTIVE TYPE DISPLAY APPARATUS USING DIELECTROPHORESIS AND METHOD OF MANUFACTURING THE REFLECTIVE TYPE DISPLAY APPARATUS

CROSS-REFERENCE TO RELATED APPLICATION

This application claims priority under 35 U.S.C. §119 to Korean Patent Application No. 10-2009-0006988, filed on Jan. 29, 2009 with the Korean Intellectual Property Office (KIPO), the disclosure of which is incorporated herein in its entirety by reference.

BACKGROUND

1. Field

Example embodiments relate to a display apparatus using dielectrophoresis and a method of manufacturing the display apparatus.

2. Description of the Related Art

Portable devices (e.g., cellular phones, personal digital assistants (PDAs), portable multimedia players (PMPs), Digital Multimedia Broadcasting (DMB) devices) have experienced a relatively rapid increase in supply and availability. As a result, displays having lower power consumption and improved external visibility have also increased in demand.

Conventional displays include liquid crystal displays. However, because of a grayscale adjustment principle using polarization of incident light, liquid crystal displays have a relatively low light efficiency in that they consume a relatively large amount of power and have limitations in terms of viewing angle and brightness. Consequently, replacements for liquid crystal displays have been researched.

Next generation display devices include displays using micro particles. For instance, an electrophoretic display device uses the movement of charged particles in an electric field and has various properties, including a wider viewing angle and lower power consumption. However, an electrophoretic display device also has problems, including more difficult color realization and a slower response time.

SUMMARY

Example embodiments include a reflective type display apparatus using dielectrophoresis and a method of manufacturing the reflective type display apparatus. A display apparatus according to example embodiments may include a first substrate and a second substrate arranged so as to face each other; a hydrophobic insulating layer on the first substrate, the hydrophobic insulating layer divided into a plurality of pixel areas; a hydrophobic pattern electrode unit arranged in each of the plurality of pixel areas to form a non-uniform electric field according to an applied voltage; a hydrophilic dielectric medium with hydrophobic uncharged particles distributed therein in a space between the first substrate and the second substrate; and a reflective plate arranged under the first substrate.

A hydrophilic grid may be arranged on the hydrophobic insulating layer so as to define the plurality of pixel areas. The hydrophobic pattern electrode unit may include a plurality of electrode areas which are electrically separated from each other and may have a pattern by which a relatively strong electric field is formed in an area between neighboring electrode areas of the plurality of electrode areas. A color filter may be arranged on a surface of the second substrate or may be arranged between the first substrate and the reflective plate.

Another display apparatus according to example embodiments may include a first substrate and a second substrate arranged to face each other; a hydrophobic insulating layer formed on the first substrate, the hydrophobic insulating layer divided into a plurality of pixel areas; a hydrophobic pattern electrode unit arranged in each of the plurality of pixel areas to form a non-uniform electric field according to an applied voltage; a hydrophilic dielectric medium with hydrophobic uncharged color particles distributed therein in a space between the first substrate and the second substrate; and an absorbing plate arranged under or on the first substrate.

A hydrophilic grid may be arranged on the hydrophobic insulating layer so as to define the plurality of pixel areas. The hydrophobic pattern electrode unit may include a plurality of electrode areas which are electrically separated from each other and may have a pattern by which a relatively strong electric field is formed in an area between neighboring electrode areas of the plurality of electrode areas.

A method of manufacturing a display apparatus according to example embodiments may include forming a hydrophobic insulating layer on a first substrate; defining a plurality of pixel areas on the hydrophobic insulating layer; forming a hydrophobic pattern electrode unit in each of the plurality of pixel areas, the hydrophobic pattern electrode unit configured to produce a non-uniform electric field according to an applied voltage; forming a hydrophilic dielectric medium with hydrophobic uncharged particles distributed therein in each of the plurality of pixel areas; and arranging a reflective plate under the first substrate.

Another method of manufacturing a display apparatus according to example embodiments may include defining a plurality of pixel areas on a hydrophobic insulating layer; forming a hydrophobic pattern electrode unit in each of the plurality of pixel areas, the hydrophobic pattern electrode unit configured to produce a non-uniform electric field according to an applied voltage; forming a hydrophilic dielectric medium with hydrophobic uncharged color particles distributed therein in each of the plurality of pixel areas; and arranging an absorbing plate under the hydrophobic insulating layer.

BRIEF DESCRIPTION OF THE DRAWINGS

The above and/or other aspects of example embodiments may become more apparent and readily appreciated when the following description is taken in conjunction with the accompanying drawings of which.

DETAILED DESCRIPTION

Figure 1:
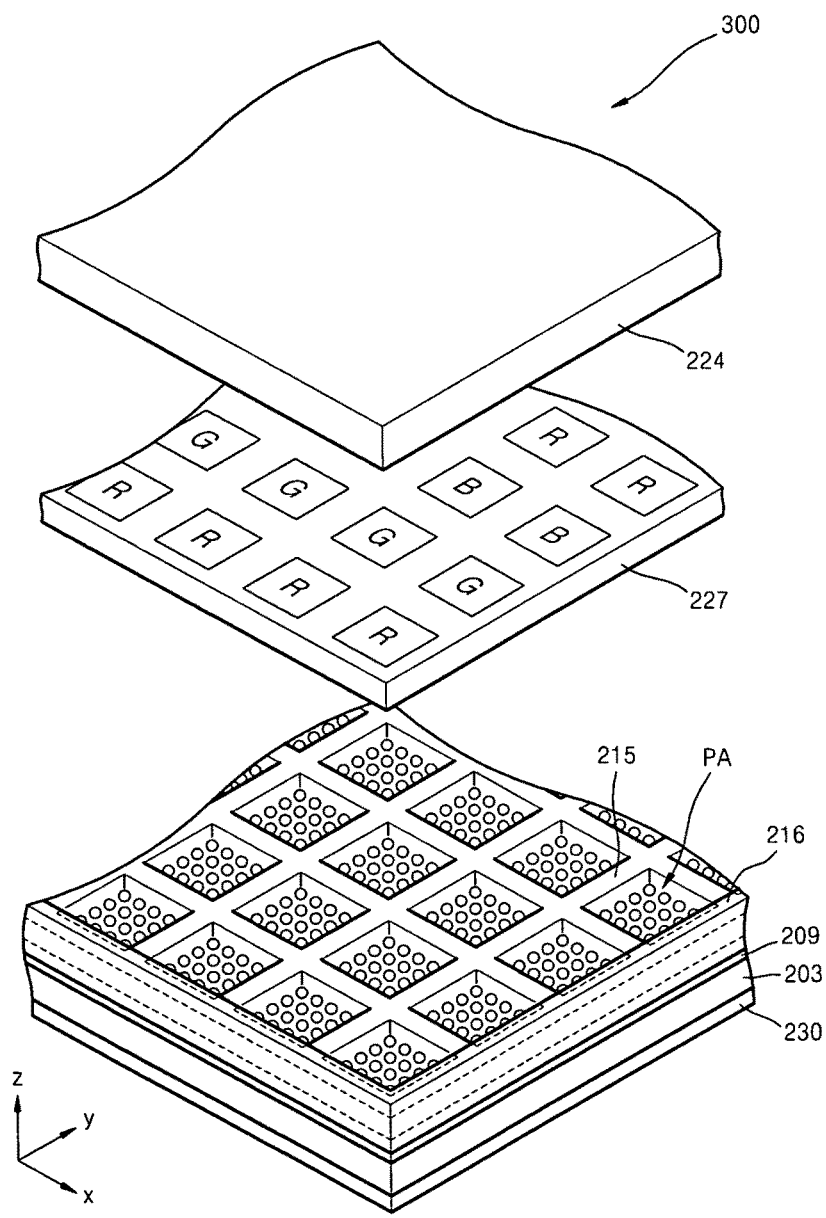
FIG. 1 is an exploded perspective view of a display apparatus according to example embodiments.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Because the display apparatus according to example embodiments uses dielectrophoresis, the phenomenon of dielectrophoresis will be briefly described before the more detailed description of example embodiments. Dielectrophoresis is a phenomenon in which an uncharged dielectric particle (in a dielectric medium which is subjected to an non-uniform electric field) has an induced dipole moment. As a result of a difference between dielectric properties of the particle and the medium, a force is generated and exerted on the dielectric particle, so that the dielectric particle moves either in response to a relatively strong electric field area or a relatively weak electric field area. For instance, a dielectric particle having a dielectric constant greater than the dielectric constant of the dielectric medium will move in response to a relatively strong electric field area. On the other hand, a dielectric particle having a dielectric constant less than the dielectric constant of the dielectric medium will move in response to the relatively weak electric field area. As described in further detail below, example embodiments use the aforementioned principle of dielectrophoresis to transmit or block external light so as to form an image.

Figure 2A:
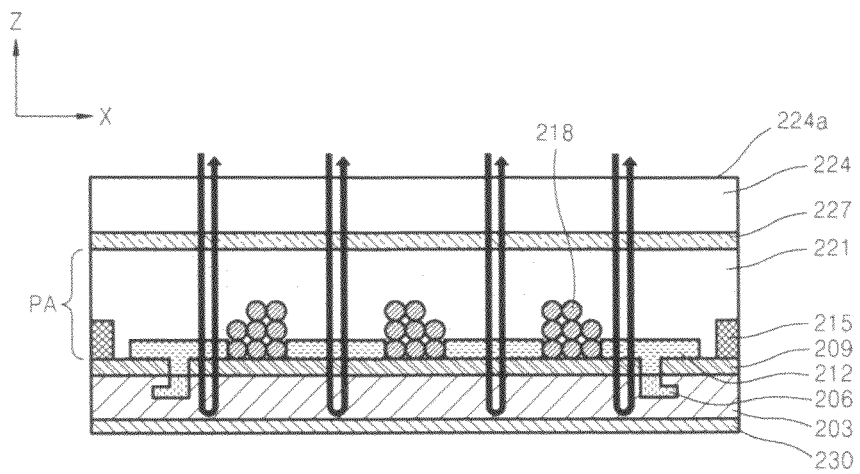
FIGS. 2A and 2B are cross-sectional views of one pixel area in the display apparatus of FIG. 1, illustrating a reflective mode for reflecting the incident external light and a block mode for blocking the incident external light, respectively.
Figure 2B:
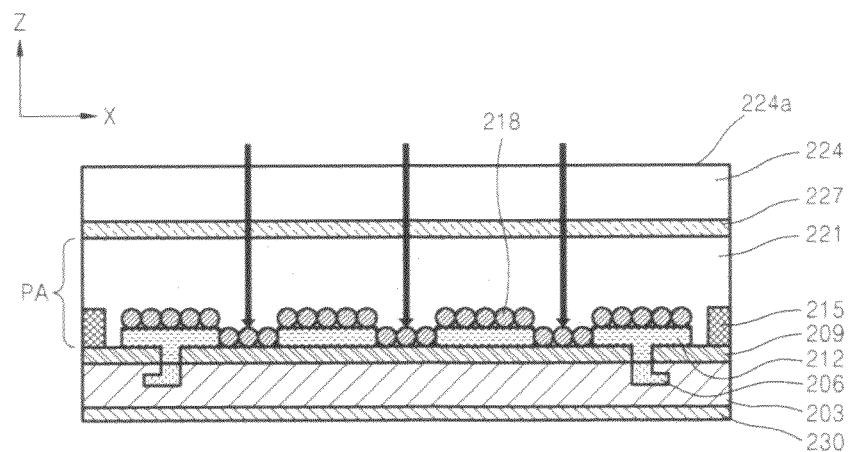
Figure 3:
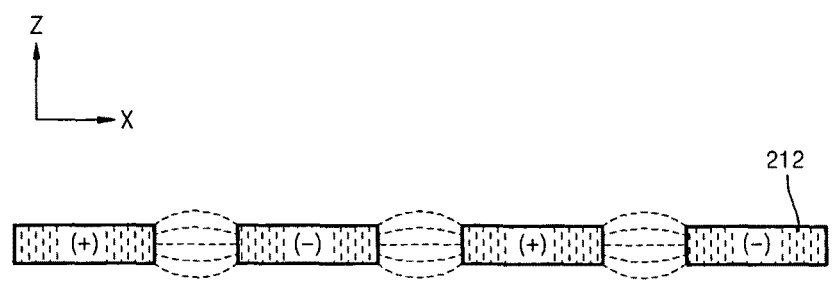
FIG. 3 is a diagram of a relatively strong electric field area formed during the reflective mode of FIG. 2A.
Figure 4:
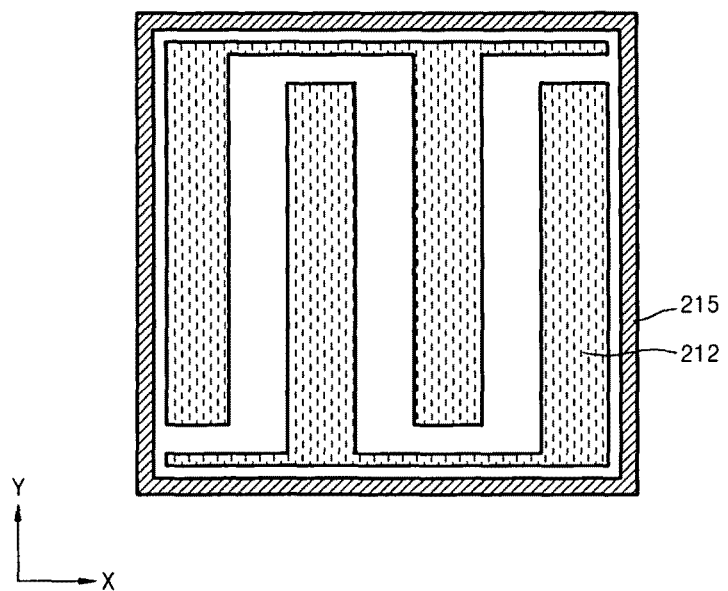
FIG. 4 is a plan view of a hydrophobic pattern electrode unit that may be employed in the display apparatus of FIG. 1.
Figure 5:
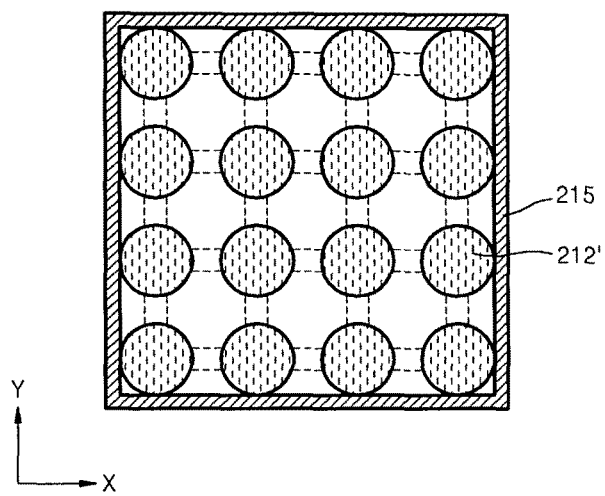
FIG. 5 is a plan view of another hydrophobic pattern electrode unit that may be employed in the display apparatus of FIG. 1.

FIG. 1 is an exploded perspective view of a display apparatus 300 according to example embodiments. FIGS. 2A and 2B are cross-sectional views of one pixel area PA in the display apparatus 300 of FIG. 1, illustrating a reflective mode for reflecting the incident external light and a block mode for blocking the incident external light, respectively. FIG. 3 is a diagram of a relatively strong electric field area formed during the reflective mode of FIG. 2A. FIGS. 4 and 5 are plan views of examples of hydrophobic pattern electrode units that may be employed in the display apparatus 300 of FIG. 1.

Referring to FIGS. 1 and 2A-2B, the display apparatus 300 may include a display panel and a reflective plate 230. The display panel may include a plurality of pixel areas PA for transmitting or blocking light using dielectrophoresis. Each pixel area PA may also include sub-pixel areas for forming red, green, and blue colors. The pixel areas PA may be arranged in a two-dimensional array as illustrated in FIG. 1.

The structure of the display panel will now be described in detail. The display panel may include first and second substrates 203 and 224 separated to face each other, a hydrophobic insulating layer 209 formed on the first substrate 203, a hydrophobic pattern electrode unit 212 formed on the hydrophobic insulating layer 209, and hydrophobic uncharged particles 218 and a hydrophilic dielectric medium 221 which are injected into a space between the first substrate 203 and the second substrate 224.

The reflective plate 230 may function to reflect external light, which is incident via the display panel, back to the display panel and may be arranged under or on the first substrate 203. A color filter 227 for forming a color image may be further arranged on one surface (e.g., lower surface) of the second substrate 224. The color filter 227 may include a plurality of color areas. For example, the color filter 227 may have a structure in which red (R), green (G), and blue (B) color areas are arrayed in a two-dimensional manner and configured for transmitting only the corresponding color light from the incident light and for absorbing the rest of the incident light. The other surface (e.g., upper surface) of the second substrate 224 may be an image display surface 224a.

The first and second substrates 203 and 224 may be formed of a light transmissive material, e.g., glass, PEN (polyethylene naphthalate), PET (polyethylene terephthalate). The hydrophobic insulating layer 209 may be formed of a material that may include at least one of BCB (benzocyclobutene), polycarbonate, PMMA (polymethyl methacrylate), Teflon, [and] poly(vinyl cinnamate), and SiO2. The hydrophobic pattern electrode unit 212 may be formed of a material that may include at least one of EDOT (ethylenedioxythiophene), PEDOT-PSS (polyethylene(3,4-dioxythiophene)/polystyrene sulfonate), polyaniline, and ITO (indium tin oxide).

As the hydrophilic dielectric medium 221, a liquid medium having a relatively low conductivity (e.g., deionized water (DI water)) or may be used. The hydrophobic uncharged particles 218 may be formed of polymer particles (e.g., black colored polystyrene).

The space above the hydrophobic insulating layer 209 may be divided into a plurality of pixel areas PA. For example, the plurality of pixel areas PA may be arranged in a two-dimensional array by a hydrophilic grid 215. In addition, a spacer 216 may be arranged along a periphery of the hydrophobic insulating layer 209 so as to surround the plurality of pixel areas PA. The plurality of pixel areas PA may correspond to the color areas R, G, B of the color filter 227. The hydrophilic grid 215 may be arranged to more efficiently separate the hydrophobic uncharged particles 218 which are arranged in each of the plurality of pixel areas PA. For instance, the hydrophobic uncharged particles 218 may be repulsed by the hydrophilic grid 215 so that the hydrophobic uncharged particles 218 remain relatively close to the hydrophobic insulating layer 209 or the hydrophobic pattern electrode unit 212 so as to avoid the hydrophilic grid 215. Thus, the possibility that the hydrophobic uncharged particles 218 will move to a neighboring pixel area PA may be reduced or prevented.

The hydrophobic pattern electrode unit 212 may be formed in each of the plurality of pixel areas PA so as to form a non-uniform electric field. When the non-uniform electric field is formed in the hydrophilic dielectric medium 221 due to the hydrophobic pattern electrode unit 212, dielectrophoresis of the hydrophobic uncharged particles 218 occurs according to an electric field gradient so that a light transmittance of each of the plurality of pixel areas PA is adjusted. The hydrophobic pattern electrode unit 212 may include a plurality of electrode areas and may be formed in such a manner that a relatively strong electric field is formed between neighboring electrode areas. For example, referring to FIG. 3, a relatively strong electric field is formed in an area, which is indicated as a dotted line corresponding to an electric power line, between neighboring electrode areas, and a relatively weak electric field compared to the area is formed in other areas. The hydrophobic pattern electrode unit 212 for forming such an electric field gradient may have a structure in which the plurality of electrode areas alternate with each other to form comb-shaped patterns, as illustrated in FIG. 4. Alternatively, as illustrated in FIG. 5, a hydrophobic pattern electrode unit 212' may have a structure in which a plurality of electrode areas form a pattern of dots. In FIG. 5, areas indicated by dotted lines between the plurality of electrode areas in the pattern of dots are areas having a relatively strong electric field.

An end of the hydrophobic pattern electrode unit 212 may be connected to a pixel electrode terminal 206 so that a voltage may be applied to the hydrophobic pattern electrode unit 212 via the pixel electrode terminal 206. A plurality of pixel electrode terminals 206 corresponding to the plurality of pixel areas PA may drive a pixel by using either an active matrix method or a passive matrix method according to an image signal. Details of the conventional components for driving pixels have been omitted from the drawings for purposes of brevity.

In the reflective mode, in which incident light is reflected, a voltage may be applied to the pixel electrode terminal 206 so that an electric field is formed in the hydrophilic dielectric medium 221. As a result, a relatively strong electric field may be formed in an area between neighboring electrode areas in the hydrophilic dielectric medium 221. As illustrated in FIG. 2A, the hydrophobic uncharged particles 218 are locally concentrated in the areas between neighboring electrodes. Thus, external light entering from the image display surface 224a may pass through a pixel area PA via the area of the hydrophilic dielectric medium 221, in which the hydrophobic uncharged particles 218 have been aggregated to create light paths. A local density of the hydrophobic uncharged particles 218 may be adjusted by adjusting the voltage applied to the pixel electrode terminal 206, and a light transmittance of the pixel area PA may be adjusted as a result. The incident external light passing through the pixel area PA may be reflected by the reflective plate 230 that is arranged under or on the first substrate 203 so as to pass through the pixel area PA again, thereby having a corresponding color while passing through the color filter 227.

In the block mode, in which the incident light is blocked, the voltage is not applied to the pixel electrode terminal 206 so that the electric field is not formed in the hydrophilic dielectric medium 221. As illustrated in FIG. 2B, the hydrophobic uncharged particles 218 remain relatively close to the hydrophobic insulating layer 209 and the hydrophobic pattern electrode unit 212 due to repulsion against the hydrophilic dielectric medium 221, so that the hydrophobic uncharged particles 218 cover almost an entire surface of the pixel area PA. Thus, the incident external light is absorbed by the hydrophobic uncharged particles 218 and is not emitted from the pixel area PA.

FIGS. 2A and 2B respectively illustrate the reflective mode and the block mode in which light is reflected and blocked with respect to one pixel area PA. However, it should be understood that the display apparatus 300 may include an array having a plurality of pixel areas PA, each of the plurality of pixel areas PA being driven in such a manner that a transmittance is adjusted according to information about an image to be formed, and a display apparatus 300 may form the image by assembling such pixels. The display apparatus 300 according to FIG. 1 may form an image in a reflective manner by using external light entering via the image display surface 224a, thereby having improved external visibility and lower power consumption.

The aforementioned description may be performed by assuming that a dielectric constant of the hydrophobic uncharged particles 218 is greater than that of the hydrophilic dielectric medium 221 so that the hydrophobic uncharged particles 218 may be densely placed in a relatively strong electric field area. However, example embodiments are not limited thereto. For instance, a structure may be formed in which the dielectric constant of the hydrophobic uncharged particles 218 is less than that of the hydrophilic dielectric medium 221 so that the hydrophobic uncharged particles 218 may be densely placed in a relatively weak electric field area. In both embodiments, a detailed structure of the hydrophobic pattern electrode unit 212 may be appropriately determined by considering a difference between the dielectric constants of the hydrophobic uncharged particles 218 and the hydrophilic dielectric medium 221 and the distribution of the electric field gradient so that the hydrophobic uncharged particles 218 may be locally concentrated in a relatively small area when voltage is applied.

Figure 6:
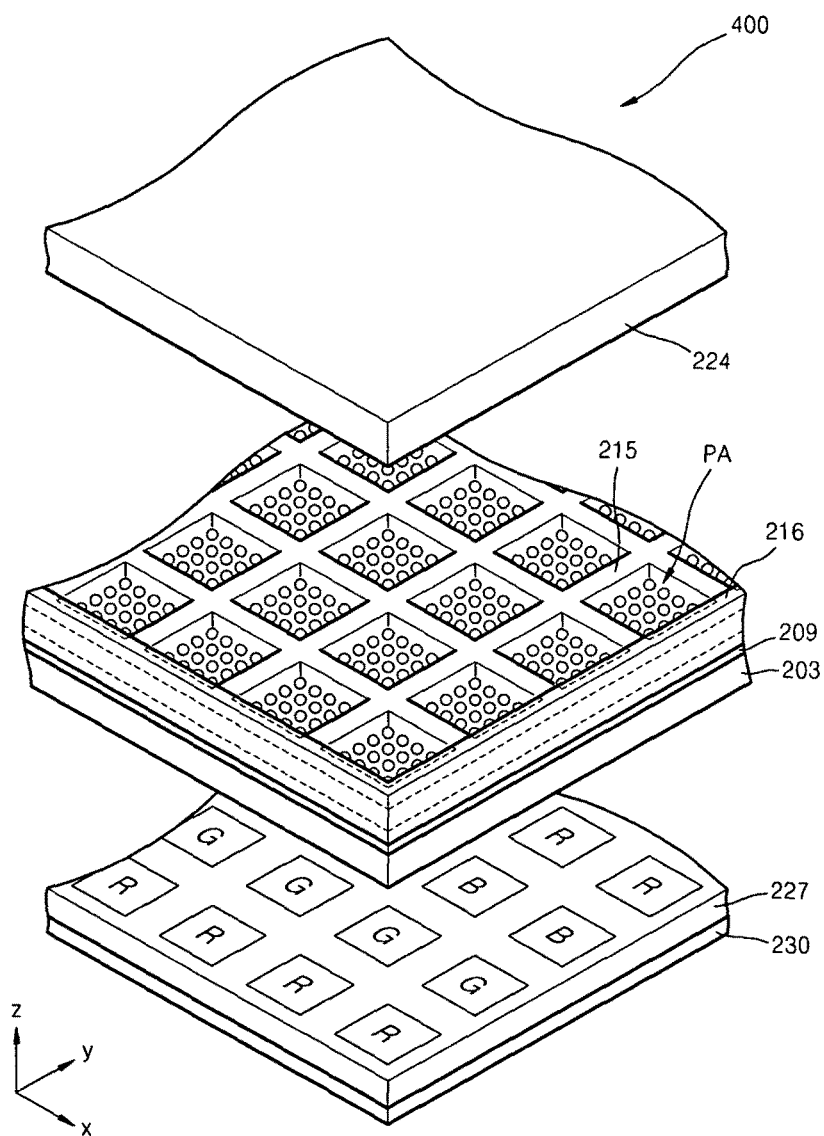
FIG. 6 is an exploded perspective view of another display apparatus according to example embodiments.
Figure 7A:
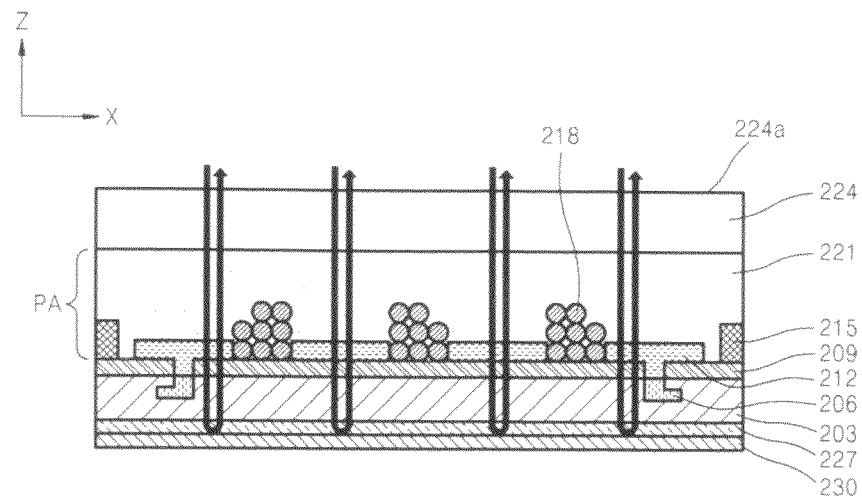
FIGS. 7A and 7B are cross-sectional views of one pixel area in the display apparatus of FIG. 6, illustrating a reflective mode for reflecting light and a block mode for blocking light, respectively.
Figure 7B:
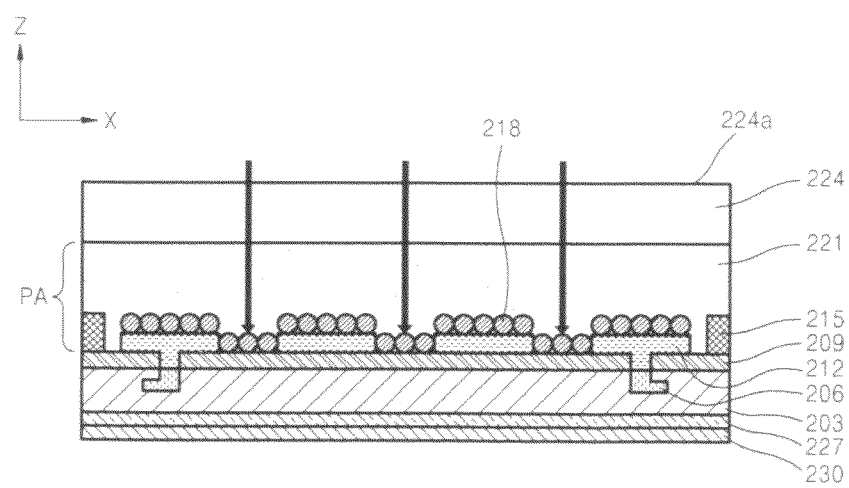

FIG. 6 is an exploded perspective view of a display apparatus 400 according to example embodiments. FIGS. 7A and 7B are cross-sectional views of one pixel area PA in the display apparatus 400 of FIG. 6, illustrating a reflective mode for reflecting light and a block mode for blocking light, respectively. The embodiment of FIG. 6 may differ from the embodiment of FIG. 1 with respect to a location of a color filter 227. For instance, as shown in FIG. 6, the color filter 227 may be arranged between a first substrate 203 and a reflective plate 230. Referring to FIG. 7A, in the reflective mode, external light entering via a display surface 224a passes through a pixel area PA and is incident on the color filter 227 so that only light of a corresponding color passes through the color filter 227 and is then reflected back toward the display surface 224a by the reflective plate 230. Although FIG. 6 is described as having a structure in which the color filter 227 operates in a transmissive manner, it also may be possible to arrange a reflective color filter under the first substrate 203. Referring to FIG. 7B, in the block mode, an electric field is not formed in a hydrophilic dielectric medium 221, and hydrophobic uncharged particles 218 remain relatively close to the hydrophobic insulating layer 209 and the hydrophobic pattern electrode unit 212 due to the repulsion against the hydrophilic dielectric medium 221, such that the hydrophobic uncharged particles 218 cover almost the entire surface of the pixel area PA. Thus, the incident external light is absorbed by the hydrophobic uncharged particles 218 and is not emitted from the pixel area PA.

Figure 8:
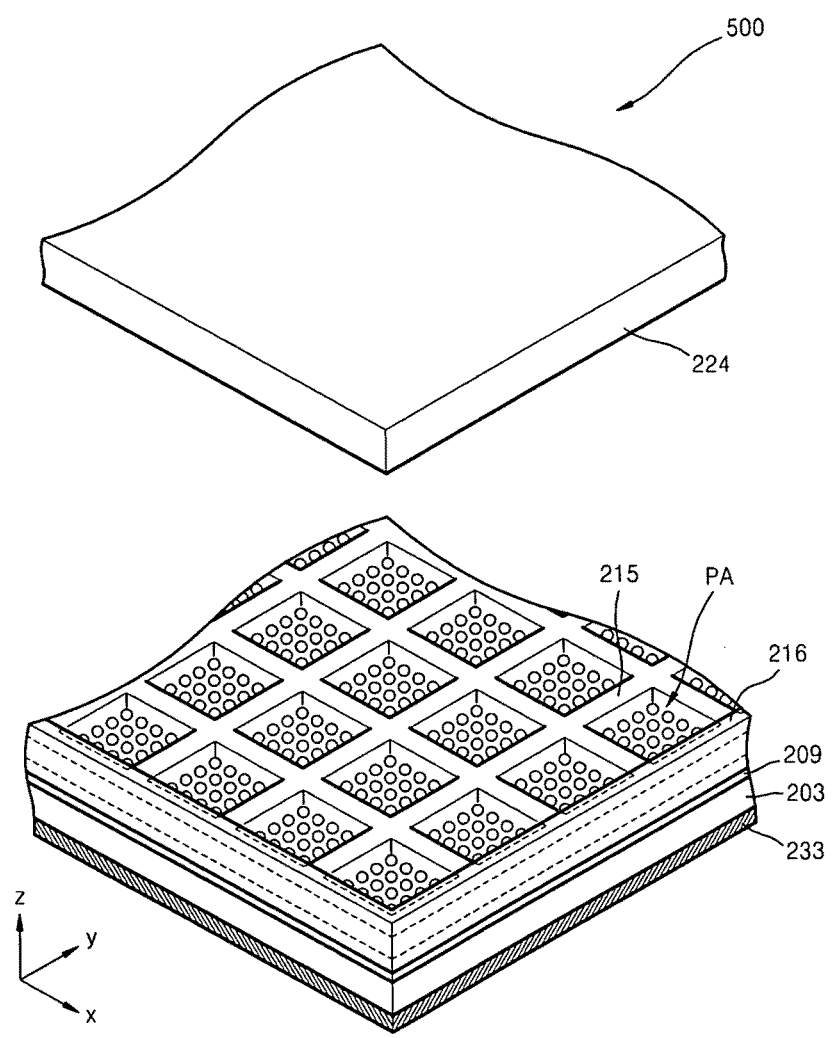
FIG. 8 is an exploded perspective view of another display apparatus according to example embodiments.
Figure 9A:
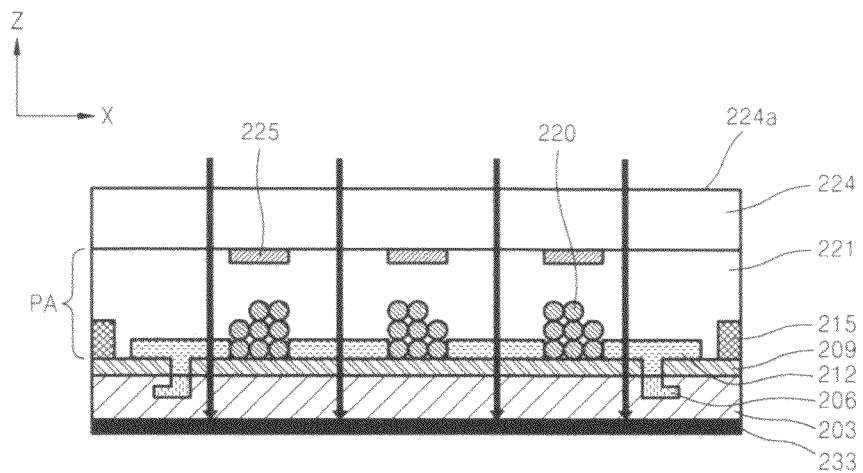
FIGS. 9A and 9B are cross-sectional views of one pixel area in the display apparatus of FIG. 8, illustrating a block mode for blocking light and a reflective mode for reflecting light, respectively.
Figure 9B:
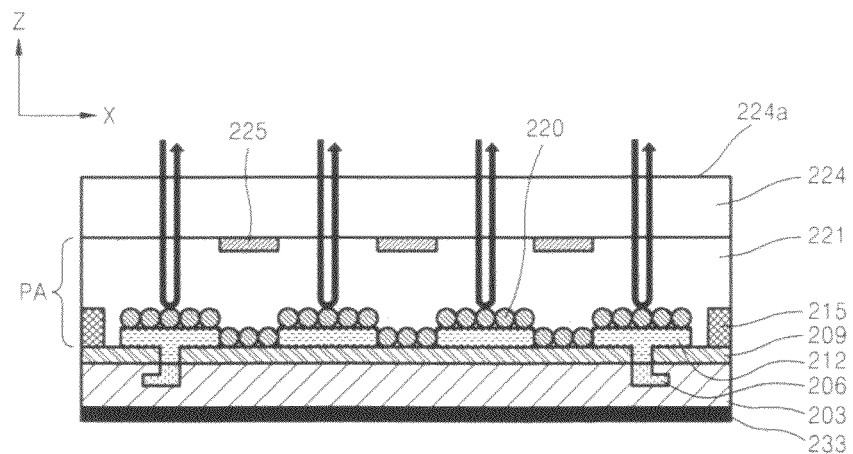

FIG. 8 is an exploded perspective view of a display apparatus 500 according to example embodiments. FIGS. 9A and 9B are cross-sectional views of one pixel area PA in the display apparatus 500 of FIG. 8, illustrating a block mode for blocking light and a reflective mode for reflecting light, respectively. The embodiment of FIG. 8 may differ from the embodiments of FIGS. 1 and 6 in that a hydrophobic uncharged color particle 220 is used to form color light, instead of a color filter. For instance, hydrophobic uncharged color particles 220 of a selected color may be arranged in a pixel area PA so as to reflect corresponding color light. The hydrophobic uncharged color particles 220 may have one of red, green, and blue colors, and hydrophobic uncharged color particles 220 having different colors may be respectively arranged in neighboring pixel areas PA. Also, an absorbing plate 233 may be arranged under a first substrate 203 so as to absorb light. An absorbing layer 225 having a pattern corresponding to regions between electrode areas of a hydrophobic pattern electrode unit 212 may be further formed on a surface (e.g., lower surface) of a second substrate 224. The absorbing layer 225 may function to reduce the amount of reflected light which may be generated in the block mode. Because brightness may also be lowered in the reflective mode by the absorbing layer 225, the arrangement or pattern of the absorbing layer 225 may be appropriately determined by considering the desired brightness.

FIG. 9A is a diagram corresponding to the block mode for blocking light. In this block mode, a voltage is applied to a pixel electrode terminal 206 so that a non-uniform electric field is formed in a dielectric medium 221. Hydrophobic uncharged color particles 220 may be locally concentrated in a region between electrode areas in which relatively strong electric fields are formed due to dielectrophoresis. Thus, external light entering the dielectric medium 221 may pass through a pixel area PA, except for regions of the pixel area PA where the hydrophobic uncharged color particles 220 are locally concentrated. After passing through the pixel area PA, the external light may be absorbed by the absorbing plate 233 arranged under the first substrate 203 and, thus, is not emitted toward a display surface 224a. The absorbing layer 225 arranged on the surface (e.g., lower surface) of the second substrate 224 may also block the incident external light from being reflected from the hydrophobic uncharged color particles 220 and emitted toward the display surface 224a.

FIG. 9B is a diagram corresponding to the reflective mode for reflecting light. In the reflective mode, a voltage is not applied to the pixel electrode terminal 206 so that an electric field is not formed and the hydrophobic uncharged color particles 220 remain relatively uniformly placed on the hydrophobic pattern electrode unit 212 and/or hydrophobic insulating layer 209. Thus, the incident external light may be reflected from the hydrophobic uncharged color particles 220, thereby exhibiting a corresponding color on the display surface 224a.

FIGS. 10A through 10I are cross-sectional views of a method of manufacturing the display apparatus 300 according to example embodiments. The method of manufacturing the display apparatus 300 may involve defining a plurality of pixel areas on the hydrophobic insulating layer 209, forming the hydrophobic pattern electrode unit 212 in each of the plurality of pixel areas in such a manner that a non-uniform electric field may be formed according to an applied voltage, and forming a dielectric medium 221 in each of the plurality of pixel areas, wherein hydrophobic uncharged particles 218 are distributed in the dielectric medium 221. The method will now be described in further detail.

Figure 10A:
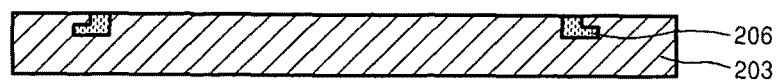
FIGS. 10A through 10D are cross-sectional views of a method of manufacturing a display apparatus, according to example embodiments.

First, as illustrated in FIG. 10A, a first substrate 203 having a pixel electrode terminal 206 arranged therein may be formed. The first substrate 203 may be formed of a light transmissive material, e.g., a glass material or plastic materials including PEN (polyethylene naphthalate) or PET (polyethylene terephthalate). In FIG. 10A, only one pixel area is illustrated. Although not described in detail with respect to the first substrate 203, conventional components may be formed to drive the pixel electrode terminals 206 according to an image signal by using an active matrix method or a passive matrix method, wherein the pixel electrode terminals 206 respectively correspond to the pixel areas.

Figure 10B:
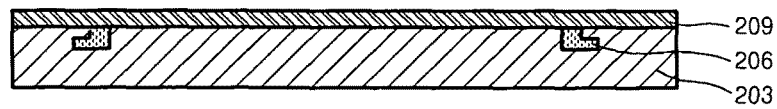

As illustrated in FIG. 10B, a hydrophobic insulating layer 209 may be formed. The hydrophobic insulating layer 209 may be formed. The hydrophobic insulating layer 209 may be formed by coating BCB (benzocyclobutene), polycarbonate, PMMA (polymethyl methacrylate),] poly(vinyl cinnamate), Teflon, or SIO2 on the first substrate 203.

Figure 10C:
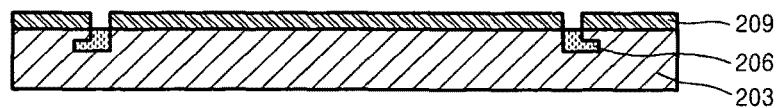

FIG. 10C corresponds to an operation in which a via-hole may be formed for connection between the pixel electrode terminal 206 and a hydrophobic pattern electrode unit 212 to be manufactured at a later time. The via-hole may be formed by performing a photolithography process, wet etching process or a reactive ionic etching (RIE) process.

Figure 10D:
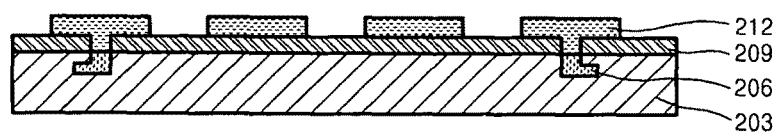

As illustrated in FIG. 10D, the hydrophobic pattern electrode unit 212 may be formed using a hydrophobic conductive material. The hydrophobic conductive material may include EDOT (3,4-ethylenedioxythiophene), PEDOT-PSS (poly(3,4-ethylenedioxythiophene) polystyrenesulfonate), polyaniline, ITO (indium tin oxide), and other suitable materials. The hydrophobic pattern electrode unit 212 has a selected pattern so as to form a non-uniform electric field.

Figure 10E:
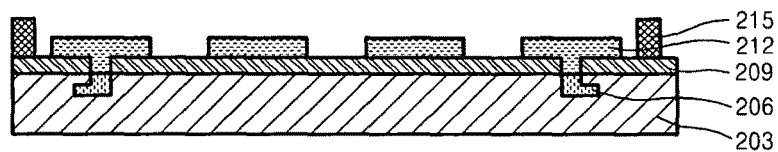

As illustrated in FIG. 10E, a hydrophilic grid 215 may be formed to define a pixel area. For example, silicon nitride ($SiN_x$) may be formed using plasma enhanced chemical vapor deposition (PECVD) or a photolithography process using SU-8 photoresist may be performed to form the hydrophilic grid 215.

Figure 10F:
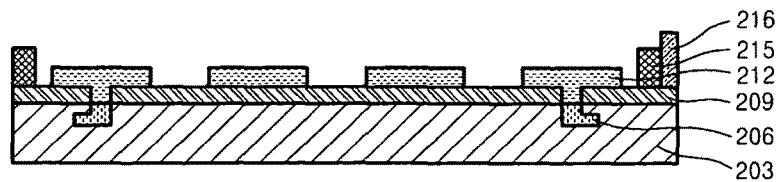

As illustrated in FIG. 10F, a spacer 216 may be formed along a periphery of the plurality of pixel areas. The spacer 216 may be formed to completely surround the plurality of pixel areas. However, for injection of a dielectric medium to be performed in a later operation, the spacer 216 may be formed to only partially surround the plurality of pixel areas. The spacer 216 may be formed of a material that may include epoxy resin, thermoset acrylate resin, isocyanate resin, phenol resin, acrylate-based oligomer, and other suitable materials.

Figure 10G:
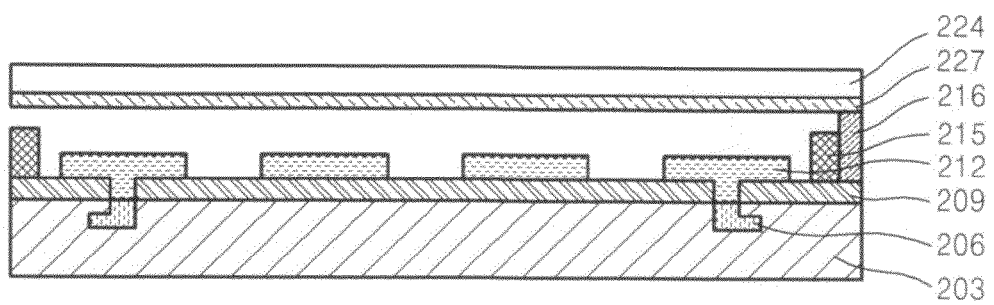

As illustrated in FIG. 10G, a second substrate 224 may be attached to the spacer 216. The second substrate 224 may be formed of a light transmissive material, e.g., a glass material or plastic materials including PEN (polyethylene naphthalate) or PET (polyethylene terephthalate). A color filter 227 may be formed on one surface (e.g., lower surface) of the second substrate 224.

Figure 10H:
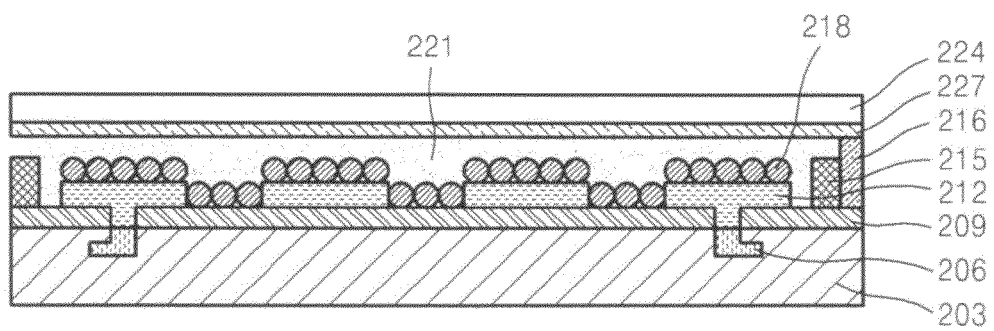

As illustrated in FIG. 10H, a hydrophilic dielectric medium 221, in which hydrophobic uncharged particles 218 are distributed, may be injected into a space defined by the first substrate 203, the spacer 216, and the second substrate 224. As the hydrophilic dielectric medium 221, a liquid medium (e.g., deionized water (DI water)) having a relatively low conductivity may be used, and the hydrophobic uncharged particles 218 may be formed of polymer particles (e.g., black colored polystyrene).

Here, the method described involves forming the second substrate 224 above the spacer 216 and then injecting the hydrophobic uncharged particles 218 and the hydrophilic dielectric medium 221. However, it may be also possible to surround the entire circumference/periphery of the plurality of pixel areas by using the spacer 216, inject the hydrophobic uncharged particles 218 and the hydrophilic dielectric medium 221, and then attach the second substrate 224 to the spacer 216.

Figure 10I:
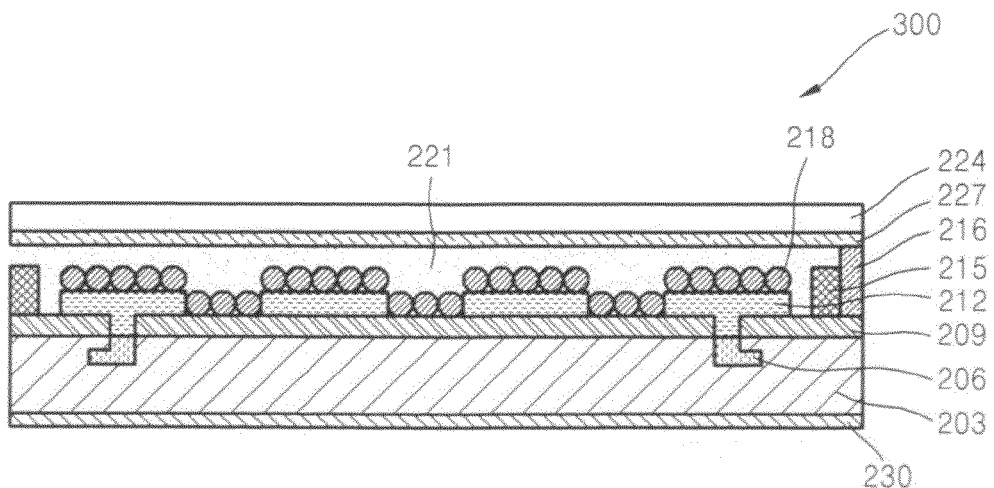

As illustrated in FIG. 10I, a reflective plate 230 may be attached under or on the first substrate 203 to complete the display apparatus 300. However, it should be understood that the reflective plate 230 may be attached under the first substrate 203 in a different order. For example, the attachment may be performed when the first substrate 203 is arranged (e.g., FIG. 10A), such that the reflective plate 230 may be attached under the first substrate 203 and then subsequent operations may be performed.

Figure 11A:
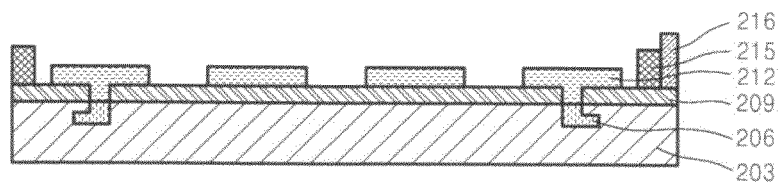
FIGS. 11A through 11D are cross-sectional views of another method of manufacturing a display apparatus according to example embodiments.
Figure 11B:
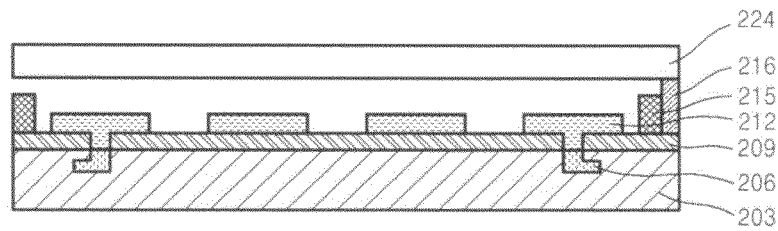
Figure 11C:
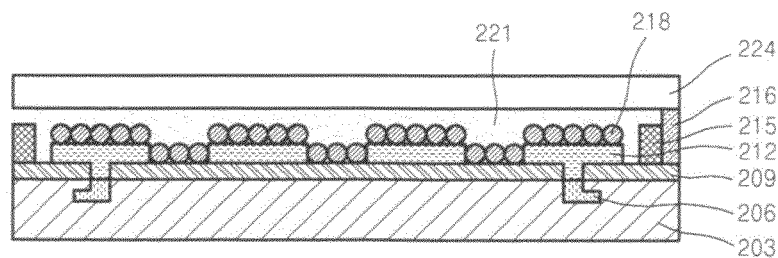
Figure 11D:
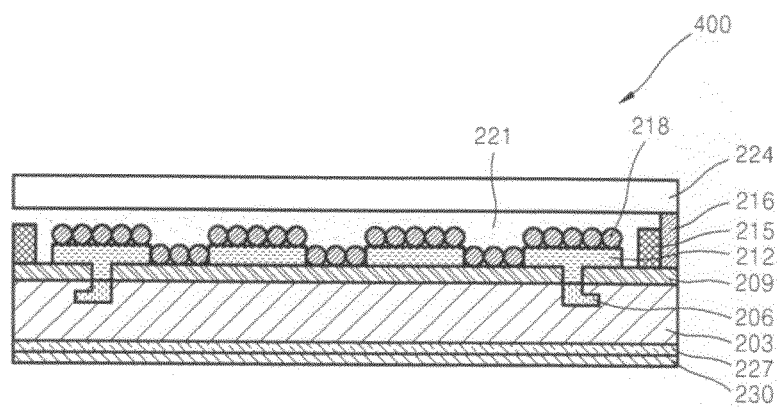

FIGS. 11A through 11D are cross-sectional views of a method of manufacturing the display apparatus 400 according to example embodiments. The display apparatus 400 manufactured by the method of FIGS. 11A through 11D may differ from the display apparatus 300 manufactured by the method of FIGS. 10A through 10I with regard to the location of the color filter. For instance, the structure shown in FIG. 11A may be formed according to operations of FIGS. 10A through 10F. As illustrated in FIG. 11B, a second substrate 224 may be attached to a spacer 216. As illustrated in FIG. 11C, a hydrophilic dielectric medium 221, in which hydrophobic uncharged particles 218 are distributed, may be injected into a space defined by the first substrate 203, the spacer 216, and the second substrate 224. As illustrated in FIG. 11D, a color filter 227 and a reflective plate 230 may be attached under or on the first substrate 203 so as to complete the display apparatus 400. Alternatively, a reflective color filter may be arranged under the first substrate 203. Also, the operation of attaching the color filter 227 and reflective plate 230 as illustrated in FIG. 11D may be performed when the first substrate 203 is initially arranged (e.g., FIG. 10A) or may be performed during any one of the subsequent operations.

Figure 12A:
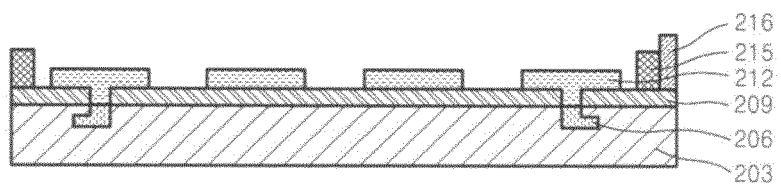
FIGS. 12A through 12D are cross-sectional views of another method of manufacturing a display apparatus according to example embodiments.
Figure 12B:
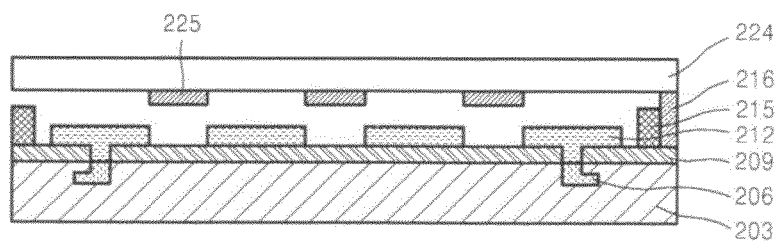
Figure 12C:
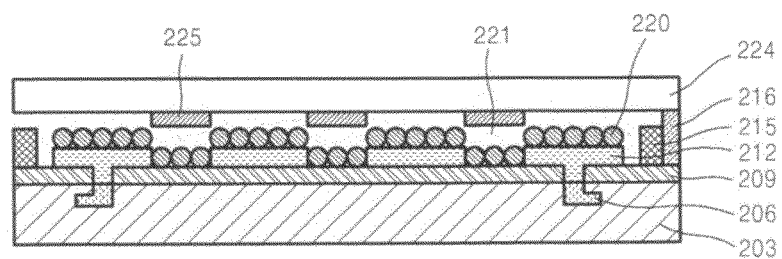
Figure 12D:
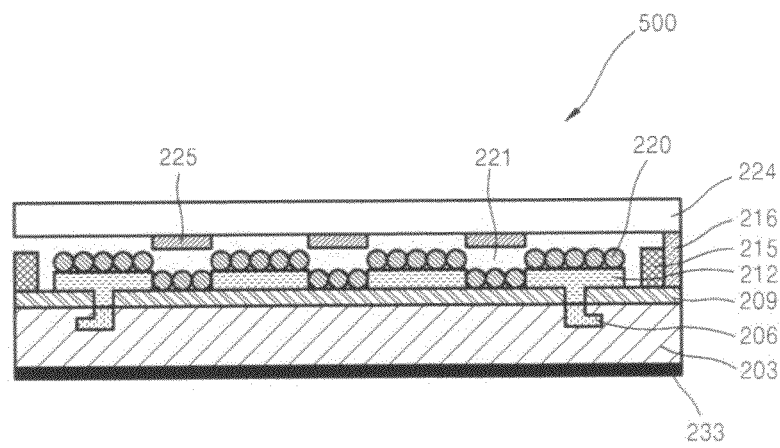

FIGS. 12A through 12D are cross-sectional views of a method of manufacturing the display apparatus 500 according to example embodiments. The structure shown in FIG. 12A may be formed according to the operations of FIGS. 10A through 10F. As illustrated in FIG. 12B, a second substrate 224 may be attached to a spacer 216. An absorbing layer 225 having a pattern corresponding to regions between electrode areas of a hydrophobic pattern electrode unit 212 may be further formed on a surface (e.g., lower surface) of the second substrate 224. As illustrated in FIG. 12C, a hydrophilic dielectric medium 221, in which hydrophobic uncharged color particles 220 are distributed, may be injected into a space defined by the first substrate 203, the spacer 216, and the second substrate 224. As illustrated in FIG. 12D, an absorbing plate 233 may be arranged under the first substrate 203 so as to complete the display apparatus 500. However, it should be understood that the attachment of the absorbing plate 233 may be performed when the first substrate 203 is initially arranged (e.g., FIG. 10A) or may be performed during any one of the subsequent operations.

The display apparatus according to example embodiments may utilize particle movement caused by dielectrophoresis, have a higher light efficiency compared to a conventional liquid crystal display (LCD), and realize color with greater ease. Also, when the particle movement occurs, residue resulting from the movement may be reduced or prevented. Because material deterioration is reduced or prevented, the display apparatus may have higher reliability. In addition, the display apparatus may use external light, thereby resulting in improved external visibility.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A display apparatus comprising:
   a first substrate and a second substrate arranged so as to face each other;
   a hydrophobic insulating layer on the first substrate, the hydrophobic insulating layer divided into a plurality of pixel areas;
   a hydrophobic pattern electrode unit arranged in each of the plurality of pixel areas to form a non-uniform electric field according to an applied voltage;

a hydrophilic dielectric medium with hydrophobic uncharged particles distributed therein in a cell area between the first substrate and the second substrate; and a reflective plate arranged under the first substrate, wherein the hydrophobic pattern electrode unit includes patterns separated by spaces therebetween, and wherein the hydrophobic pattern electrode unit is configured such that when a voltage is not applied thereto, the hydrophobic uncharged particles are settled down in the hydrophilic dielectric medium to contact the hydrophobic insulating layer and the hydrophobic pattern electrode unit and cover the cell area; and the hydrophobic pattern electrode unit is configured such that when a voltage is applied thereto, the hydrophobic uncharged particles are concentrated in the spaces between the patterns so that incident light can pass through the cell area.

2. The display apparatus of claim 1, wherein the hydrophobic pattern electrode unit includes a plurality of electrically-separated electrode areas arranged in a pattern so as to produce an electric field between adjacent electrode areas.

3. The display apparatus of claim 2, wherein the plurality of electrode areas alternate with each other to form comb-shaped patterns.

4. The display apparatus of claim 2, wherein the plurality of electrode areas form a pattern of dots.

5. The display apparatus of claim 1, further comprising:
a hydrophilic grid arranged on the hydrophobic insulating layer to define the plurality of pixel areas.

6. The display apparatus of claim 1, further comprising:
a color filter arranged on a surface of the second substrate.

7. The display apparatus of claim 1, further comprising:
a color filter arranged between the first substrate and the reflective plate.

8. The display apparatus of claim 1, wherein the reflective plate is a reflective color filter.

9. A display apparatus comprising:
a first substrate and a second substrate arranged to face each other;
a hydrophobic insulating layer on the first substrate, the hydrophobic insulating layer divided into a plurality of pixel areas;
a hydrophobic pattern electrode unit arranged in each of the plurality of pixel areas to form a non-uniform electric field according to an applied voltage;
a hydrophilic dielectric medium with hydrophobic uncharged color particles distributed therein in a cell area between the first substrate and the second substrate; and
an absorbing plate arranged under the first substrate,
wherein the hydrophobic pattern electrode unit includes patterns separated by spaces therebetween, and
wherein the hydrophobic pattern electrode unit is configured such that when a voltage is not applied thereto, the hydrophobic uncharged color particles are settled down in the hydrophilic dielectric medium to contact the hydrophobic insulating layer and the hydrophobic pattern electrode unit and cover the cell area, and the hydrophobic pattern electrode unit is configured such that when a voltage is applied thereto, the hydrophobic uncharged color particles are concentrated in the spaces between the patterns so that incident light can pass through the cell area.

10. The display apparatus of claim 9, wherein the hydrophobic pattern electrode unit includes a plurality of electrically-separated electrode areas arranged in a pattern so as to produce an electric field between adjacent electrode areas.

11. The display apparatus of claim 10, wherein the plurality of electrode areas alternate with each other to form comb-shaped patterns.

12. The display apparatus of claim 10, wherein the plurality of electrode areas form a pattern of dots.

13. The display apparatus of claim 10, further comprising:
an absorbing layer on a surface of the second substrate and having a pattern corresponding to regions between the plurality of electrode areas.

14. The display apparatus of claim 9, further comprising:
a hydrophilic grid arranged on the hydrophobic insulating layer so as to define the plurality of pixel areas.

15. A method of manufacturing a display apparatus, comprising:
forming a hydrophobic insulating layer on a first substrate;
defining a plurality of pixel areas on the hydrophobic insulating layer;
forming a hydrophobic pattern electrode unit in each of the plurality of pixel areas, the hydrophobic pattern electrode unit configured to produce a non-uniform electric field according to an applied voltage;
forming a hydrophilic dielectric medium with hydrophobic uncharged particles distributed therein in each of the plurality of pixel areas; and
arranging a reflective plate under the first substrate,
wherein the hydrophobic pattern electrode unit includes patterns separated by spaces therebetween, and
wherein the hydrophobic pattern electrode unit is configured such that when a voltage is not applied thereto, the hydrophobic uncharged particles are settled down in the hydrophilic dielectric medium to contact the hydrophobic insulating layer and the hydrophobic pattern electrode unit and cover the pixel areas, and the hydrophobic pattern electrode unit is configured such that when a voltage is applied thereto, the hydrophobic uncharged particles are concentrated in the spaces between the patterns so that incident light can pass through the pixel areas.

16. The method of claim 15, further comprising:
forming a hydrophilic grid to define the plurality of pixel areas.

17. The method of claim 15, wherein forming the hydrophilic dielectric medium includes:
forming a spacer to surround a periphery of the plurality of pixel areas;
forming a second substrate on the spacer; and
injecting the hydrophilic dielectric medium with the hydrophobic uncharged particles distributed therein into a space defined by the first substrate, the spacer, and the second substrate.

18. The method of claim 17, wherein a substrate having a color filter attached thereto is used as the second substrate.

19. The method of claim 15, further comprising:
arranging a color filter between the first substrate and the reflective plate.

20. A method of manufacturing a display apparatus, comprising:
defining a plurality of pixel areas on a hydrophobic insulating layer;
forming a hydrophobic pattern electrode unit in each of the plurality of pixel areas, the hydrophobic pattern electrode unit configured to produce a non-uniform electric field according to an applied voltage;
forming a hydrophilic dielectric medium with hydrophobic uncharged color particles distributed therein in each of the plurality of pixel areas; and arranging an absorbing plate under the hydrophobic insulating layer, wherein the hydrophobic pattern electrode unit includes patterns separated by spaces therebetween, and wherein the hydrophobic pattern electrode unit is configured such that when a voltage is not applied thereto, the hydrophobic uncharged color particles are settled down in the hydrophilic dielectric medium to contact the hydrophobic insulating layer and the hydrophobic pattern electrode unit and cover the pixel areas, and the hydrophobic pattern electrode unit is configured such that when a voltage is applied thereto, the hydrophobic uncharged color particles are concentrated in the spaces between the patterns so that incident light can pass through the pixel areas.

21. The method of claim 20, further comprising:

forming a hydrophilic grid to define the plurality of pixel areas.

22. The method of claim 20, wherein forming the hydrophilic dielectric medium includes:

forming a spacer to surround the plurality of pixel areas;

forming a substrate on the spacer to create a space defined by the hydrophobic insulating layer, the spacer, and the substrate; and injecting the hydrophilic dielectric medium with the hydrophobic uncharged color particles distributed therein into the space.

\* \* \* \* \*